United States Patent
Ono et al.

(10) Patent No.: US 8,854,716 B2
(45) Date of Patent: Oct. 7, 2014

(54) REFLECTION TYPE VARIABLE OPTICAL ATTENUATOR

(75) Inventors: Hiroaki Ono, Tokyo (JP); Hidenori Nakada, Tokyo (JP); Hirotaka Kawai, Tokyo (JP); Yuko Ota, Tokyo (JP); Taro Nakamura, Tokyo (JP)

(73) Assignee: FDK Corporation, Tokyo (JP)

( * ) Notice: Subject to any disclaimer, the term of this patent is extended or adjusted under 35 U.S.C. 154(b) by 0 days.

(21) Appl. No.: 13/811,043

(22) PCT Filed: Jun. 27, 2011

(86) PCT No.: PCT/JP2011/064642
§ 371 (c)(1),
(2), (4) Date: Jan. 18, 2013

(87) PCT Pub. No.: WO2012/011365
PCT Pub. Date: Jan. 26, 2012

(65) Prior Publication Data
US 2013/0120824 A1 May 16, 2013

(30) Foreign Application Priority Data
Jul. 22, 2010 (JP) ................................ 2010-165006

(51) Int. Cl.
*G02F 1/09* (2006.01)
*G02B 27/28* (2006.01)

(52) U.S. Cl.
CPC . *G02F 1/09* (2013.01); *G02B 27/28* (2013.01)
USPC ........................................................ 359/284

(58) Field of Classification Search
USPC ............................................... 359/280–284
See application file for complete search history.

(56) References Cited

U.S. PATENT DOCUMENTS

| | | | |
|---|---|---|---|
| 2004/0027639 A1* | 2/2004 | Iwatsuka | 359/283 |
| 2004/0105141 A1* | 6/2004 | Nagaeda | 359/280 |

FOREIGN PATENT DOCUMENTS

| | | | |
|---|---|---|---|
| JP | 11-199390 A | | 7/1999 |
| JP | 1-230498 A | | 9/1999 |
| JP | 2004-177639 A | | 6/2004 |
| JP | 2005-208295 A | | 8/2005 |
| JP | 2005208295 A | * | 8/2005 |
| JP | 2007-071982 A | | 3/2007 |
| JP | 2007-199112 A | | 8/2007 |

OTHER PUBLICATIONS

International Search Report issued in PCT/JP2011/064642 mailed Aug. 9, 2011 (4 pages).

(Continued)

*Primary Examiner* — Mahidere Sahle
(74) *Attorney, Agent, or Firm* — Osha Liang LLP

(57) ABSTRACT

An input/output port, a birefringent element, variable polarization rotator, and a reflector are arranged along an optical axis in the order named. The variable polarization rotator includes permanent magnets for applying a fixed magnetic field to a Faraday rotator in an in-plane direction to magnetically saturate the Faraday rotator and a solenoid coil for applying a variable magnetic field to the Faraday rotator in a direction of the optical axis. A fixed magnetic field is applied in the <211> direction, in which the Faraday rotator is likely to be magnetically saturated. The Faraday rotator can be saturated with a low magnetic field of about 100 Oe. The permanent magnets may employ ferrite permanent magnets, which have weak magnetic forces. A variable magnetic field may also be reduced. Therefore, an air-core coil can be used.

11 Claims, 7 Drawing Sheets

(56) References Cited

OTHER PUBLICATIONS

Written Opinion issued in PCT/JP2011/064642 mailed Aug. 9, 2011 (3 pages).
Patent Abstracts of Japan, Publication No. 2005-208295 dated Aug. 4, 2005 (1 page).
Patent Abstracts of Japan, Publication No. 2004-177639 dated Jun. 24, 2004 (1 page).
Patent Abstracts of Japan, Publication No. 2007-199112 dated Aug. 9, 2007 (1 page).
Patent Abstracts of Japan, Publication No. 11-199390 dated Jul. 27, 1999 (1 page).
Patent Abstracts of Japan, Publication No. 01-230498 dated Sep. 13, 1989 (1 page).
Patent Abstracts of Japan, Publication No. 2007-071982 dated Mar. 22, 2007 (1 page).

* cited by examiner (a)

(b)

(a)

(b)

(a)

<211>

(b)

<110>

(a)

(b)

REFLECTION TYPE VARIABLE OPTICAL ATTENUATOR

TECHNICAL FIELD

The present invention relates to a reflection type variable optical attenuator used in optical communication, optical instruments, and the like.

BACKGROUND ART

In optical communication and the like, there are required variable optical attenuators, which are optical devices for controlling the quantity of transmitted light. Examples of variable optical attenuators include a reflection type variable optical attenuator as disclosed in Patent Literature 1 or the like. A reflection type variable optical attenuator is formed by optics arranged in a predetermined order along a direction in which incident light travels. Specifically, the optics are arranged as follows: A birefringent element 4, a convergent lens (convex lens) 5, and variable polarization rotation means 6, and a reflecting mirror 7 are arranged outside of an end of a dual-core ferrule 3 to which an input fiber 1 and an output fiber 2 are attached, in the order named from an incoming/outgoing surface of the dual-core ferrule 3. For the sake of convenience, the z-direction (rightward direction in the figure) is defined as a direction in which the optics are arranged (or incident light travels), and the x-direction (horizontal direction) and the y-direction (vertical direction) are defined as two directions perpendicular to the z-direction. Thus, FIG. 2(a) is a plan view, and FIG. 2(b) is a front view.

The input fiber 1 and the output fiber 2 are arranged in parallel to each other along the x-direction. In this example, the input fiber 1 is arranged on a right optical path as seen in the z-direction, and the output fiber 2 is arranged on a left optical path. The birefringent element 4 employs a plane-parallel birefringent element for separation and composition of polarized waves, which is capable of splitting, in the y-direction, light beams directed toward the z-direction on the same optical path with directions of polarization perpendicular to each other and of combining light beams directed toward the −z-direction on different optical paths. The reflecting mirror 7 is arranged at a focus point of the lens 5.

The variable polarization rotation means 6 includes a Faraday rotator 6a and an arrangement for applying a composite magnetic field of a fixed magnetic field and a variable magnetic field to the Faraday rotator 6a from two directions. The fixed magnetic field is applied in a direction in which the light travels by a disk-like permanent magnet 6b arranged behind the reflecting mirror 7. The variable magnetic field is applied in a direction perpendicular to the direction in which the light travels by an electromagnet 6c. Those two magnetic fields are applied to the Faraday rotator 6a, so that a Faraday rotation angle of the Faraday rotator 6a varies according to the composite magnetic field.

The principle of operation of the reflection type variable optical attenuator having the above configuration is as follows: Light emitted from the input fiber 1 passes through the birefringent element 4 and the lens 5, then converges on the reflecting mirror 7, and reflects from the reflecting mirror 7. The reflected return light passes through the lens 5 and the birefringent element 4 again and then exits. During this process, the light travels to and fro through the Faraday rotator 6a of the variable polarization rotation means 6. The quantity of reflected output light is controlled by adjusting a rotation angle of the direction of polarization with this variable polarization rotation means 6.

Specifically, light emitted from the input fiber 1 in the z-direction is optically split into an ordinary ray and an extraordinary ray in the y-direction by the birefringent element 4. Then the light is condensed by the lens 5. While the light is being condensed, it passes through the Faraday rotator 6a. When the Faraday rotation angle is zero degree, the light reflects from the reflecting mirror 7, which is located at the focus point of the lens, in a state in which the direction of polarization has not been rotated. Reflected light returning toward the −z-direction passes through the Faraday rotator 6a and the lens 5 again. At that time, the direction of polarization is not rotated. However, the positions of the ordinary ray and the extraordinary ray of the reflected light are shifted in diagonal directions from the focus point on the xy-plane. Then, at the birefringent element 4, all of the ordinary ray and the extraordinary ray are further split in the y-direction. Therefore, the incident light from the input fiber 1 is hardly coupled to the output fiber 2. In other words, almost the whole quantity of incident light from the input fiber 1 is attenuated.

Meanwhile, when the Faraday rotation angle is set to be 45 degrees, the light reflects from the reflecting mirror 7, which is located at the focus point of the lens, in a state in which the direction of polarization has been rotated through 45 degrees. At that time, the positions of the ordinary ray and the extraordinary ray are shifted in diagonal directions from the focus point on the xy-plane. The reflected light returning toward the −z-direction passes through the Faraday rotator 6a and the lens 5 again. At that time, the direction of polarization is further rotated through 45 degrees (thus 90 degrees in total). The direction of polarization of the light passing through the birefringent element 4 is rotated through 90 degrees. The ordinary ray and the extraordinary ray that have further been shifted in diagonal directions are combined in polarization with each other in the y-direction. Thus, almost the whole quantity of incident light from the input fiber 1 is emitted to the output fiber 2 while it is hardly attenuated.

Furthermore, the direction of polarization can be rotated through any angle with the variable polarization rotation means 6 through adjusting a magnetic field generated by the electromagnet 6c. For example, if the direction of polarization is adjusted so as to be rotated through 22.5 degrees, the light reflects from the reflecting mirror 7, which is located at the focus point of the lens, in a state in which the direction of polarization has been rotated through 22.5 degrees. The reflected light returning toward the −z-direction passes through the Faraday rotator 6a and the lens 12 again. At that time, the direction of polarization is further rotated through the same angle, or 22.5 degrees. Thus, the direction of polarization is rotated through 45 degrees in total. Then parts of the ordinary ray and the extraordinary ray are combined in polarization with each other in the y-direction by the birefringent element 4 and coupled to the output fiber 2. The rest of the ordinary ray and the extraordinary ray is further split in polarization in the y-direction and, therefore, is not coupled to the output fiber. Accordingly, if the Faraday rotation angle is set to be 22.5 degrees, the incident light from the input fiber 1 is attenuated so that the quantity of incident light is reduced almost by half. Then the light is emitted to the output fiber. In this manner, the amount of attenuation of the incident light (i.e., the quantity of reflected output light) can be adjusted as desired by controlling a rotation angle of the direction of polarization with the variable polarization rotation means 6.

PRIOR ART

Patent Literatures

Patent Literature 1: JP-A 2007-199112

SUMMARY OF THE INVENTION

Problem(s) to be Solved by the Invention

With the aforementioned conventional configuration, a fixed magnetic field generated by the permanent magnet 6b is applied to the Faraday rotator 6a in a direction in which light transmits (the z-direction), and a variable magnetic field generated by the electromagnet 6c is applied to the Faraday rotator 6a in an in-plane direction (the x-direction). Furthermore, the permanent magnet 6b is arranged outside of the reflecting mirror 7 so that each of the magnetic field generation means does not interfere with optical paths of the incident light and the reflected light. When the Faraday rotator 6a is to magnetically be saturated with use of a permanent magnet having a weak magnetic force, such as a ferrite permanent magnet, then the permanent magnet needs to have a large volume, resulting in an increase of the size of the apparatus. Therefore, a rare-earth permanent magnet such as a samarium-cobalt magnet or a neodymium magnet, which has a strong magnetic force, has been used for this purpose. However, a rare-earth magnet rusts and thus requires a rust prevention treatment.

Furthermore, the Faraday rotation angle is controlled by a composite magnetic field generated from the fixed magnetic field and the variable magnetic field. If the fixed magnetic field is excessively high relative to the variable magnetic field, then only a fine rotation angle can be generated. Therefore, both of the magnetic fields should be matched in intensity. Meanwhile, a rare-earth magnet has a high magnetic flux density. Accordingly, in order to adjust a saturation magnetic field due to the permanent magnet into a necessary and sufficient level for magnetically saturating the Faraday rotator, the permanent magnet should be positioned relatively far away from the Faraday rotator 6a or reduced in size as much as possible. In the former case where the permanent magnet is positioned relatively far away from the Faraday rotator 6a, the entire apparatus is increased in size, exerting an adverse influence on size reduction of the apparatus. In the latter case where the permanent magnet is reduced in size, it is difficult to finely machine the permanent magnet into a thin plate because a rare-earth magnet is brittle.

Furthermore, in order to enhance the variable magnetic field to some extent, a material having a high magnetic permeability may be used for a core 6c' in a magnetic circuit of the electromagnet 6c. Alternatively, the number of turns of a coil may be increased. However, a material having a high magnetic permeability rusts and thus requires a rust prevention treatment. Furthermore, there are some limitations on increasing the number of turns of a coil, which also causes an increase in size of the apparatus.

The present invention relates to a reflection type variable optical attenuator in which means for magnetically saturating a Faraday rotator and the like are reduced in size and simplified.

Means for Solving the Problem(s)

In order to solve the above problems, (1) a reflection type optical attenuator according to the present invention is a reflection type variable optical attenuator having an optical input/output portion, an optical attenuation mechanism having a Faraday rotator, and a reflector arranged along an optical axis in order named. The optical attenuation mechanism includes a permanent magnet for applying a fixed magnetic field to the Faraday rotator in an in-plane direction to magnetically saturate the Faraday rotator and variable magnetic field generation means for applying a variable magnetic field to the Faraday rotator in a direction of the optical axis. The permanent magnet is arranged so as to face a side surface of the Faraday rotator in a direction intersecting the optical axis. In an embodiment, the optical input/output portion includes a dual-core ferrule, a birefringent element 11 having functions of a polarizer and an analyzer, and the like. The optical attenuation mechanism corresponds to a variable polarization rotation means 14 in an embodiment.

Since a bias magnetic field (fixed magnetic field) is applied in an in-plane direction to magnetically saturate the Faraday rotator, the permanent magnet can be located close to the Faraday rotator so that the permanent magnet faces an outer side surface of the Faraday rotator that is deviated from the optical axis. The variable magnetic field generation means can be implemented by a coil, other electromagnets, and the like. Since a magnetic field is applied to the Faraday rotator in the direction of the optical axis, the variable magnetic field generation means can be implemented by, for example, a cylindrical coil arranged so as to surround the Faraday rotator or the like. Therefore, the means for applying magnetic fields can be integrated compactly as compared to the conventional example shown in FIG. 1 and the like. Thus, the apparatus can be reduced in size. Furthermore, since the permanent magnet is located close to the Faraday rotator, it may employ a permanent magnet having a low magnetic permeability that generates a fine magnetic field, which is preferable because such a permanent magnet can be obtained inexpensively and readily, for example, like a ferrite magnet.

(2) The permanent magnet may comprise a ferrite permanent magnet, the variable magnetic field generation means may comprise an air-core coil, and the Faraday rotator and the permanent magnet may be arranged within an internal space of the air-core coil. Since a ferrite permanent magnet does not rust, no rust prevention treatment is required, and the reflection type variable optical attenuator can readily be manufactured. Furthermore, use of an air-core coil provides a simple arrangement without a core and the like.

(3) The Faraday rotator may comprise a single crystal of rare-earth iron garnet, a direction in which the fixed magnetic field is applied may be set to be an <211> direction of the Faraday rotator, and a direction in which the variable magnetic field is applied may be set to be an <111> direction of the Faraday rotator. Since the Faraday rotator is likely to be magnetically saturated in the <211> direction, the Faraday rotator can be magnetically saturated with a lower magnetic field (e.g., 100 oersteds or less). Accordingly, the Faraday rotation angle can be rotated even with a low variable magnetic field. Therefore, the reflection type variable optical attenuator can be implemented with a smaller structure.

(4) The Faraday rotator may comprise a single crystal of rare-earth iron garnet, a direction in which the fixed magnetic field is applied may be set to be 5 degrees to 20 degrees from an <211> direction of the Faraday rotator, and a direction in which the variable magnetic field is applied may be set to be an <111> direction of the Faraday rotator. Angles smaller than 5 degrees increases a loss, and angles larger than 20 degrees increase a saturation magnetic field to be higher than 150 oersteds. Therefore, the aforementioned range is preferable if the required specifications become stricter.

(5) The reflection type variable optical attenuator may comprise a rotation angle correction Faraday rotator that is arranged on the optical axis and magnetic field application means for setting a Faraday rotation angle of the rotation angle correction Faraday rotator. The Faraday rotation angle of the Faraday rotator and the Faraday rotation angle of the rotation angle correction Faraday rotator may be set such that 100% of reflected light of incident light inputted from the optical input/output portion that has been reflected from the reflector is outputted from the optical input/output portion or is blocked when the variable magnetic field is zero. With this configuration, desired characteristics of the entire reflection type variable optical attenuator can be obtained by properly setting the Faraday rotation angle of the rotation angle correction Faraday rotator even if a desired range of the Faraday rotation angle cannot be obtained only with the Faraday rotator of the optical attenuation mechanism.

Advantageous Effects of the Invention

According to the present invention, means for magnetically saturating a Faraday rotator can be reduced in size and simplified. A configuration for applying a variable magnetic field can accordingly be simplified. When a single crystal of rare-earth iron garnet is used for the Faraday rotator, a saturation magnetic field can be reduced by setting a magnetic saturation direction of the Faraday rotator at the <211> direction of the Faraday rotator. Therefore, means for generating a saturation magnetic field can be changed from a rare-earth magnet, which requires a rust prevention treatment, to a ferrite permanent magnet, which requires no rust prevention treatment. Furthermore, since a saturation magnetic field is low, a variable magnetic field can also be reduced. Thus, means for generating a variable magnetic field does not need a magnetic circuit using expensive materials having a high magnetic permeability. Therefore, there can be provided a reflection type variable optical attenuator that is compact and inexpensive.

BEST MODE FOR CARRYING OUT THE INVENTION

Figure 3:
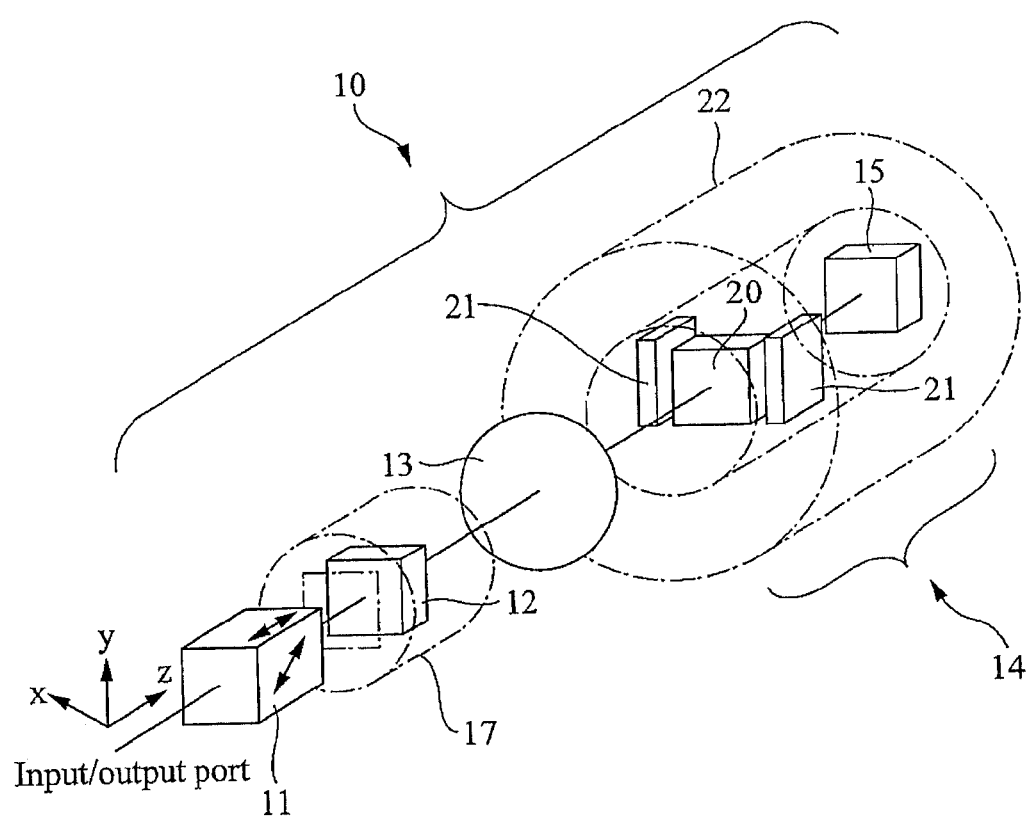
FIG. 3 is a diagram showing a preferred embodiment of a reflection type variable optical attenuator according to the present invention.

Preferred embodiments of the present invention will be described below. FIG. 3 illustrates a reflection type variable optical attenuator 10 according to a preferred embodiment of the present invention. In the reflection type variable optical attenuator 10 of this embodiment, a birefringent element 11 is arranged so that the birefringent element 11 faces an input/output port of a dual-core ferrule, which is omitted from the illustration. Along a direction in which incident light emitted from the input/output port (input fiber) travels, a rotation angle correction Faraday rotator 12, a convergent lens 13, variable polarization rotation means 14, and a reflector 15 are arranged on a rear side of the birefringent element 11 in the order named.

Figure 1:
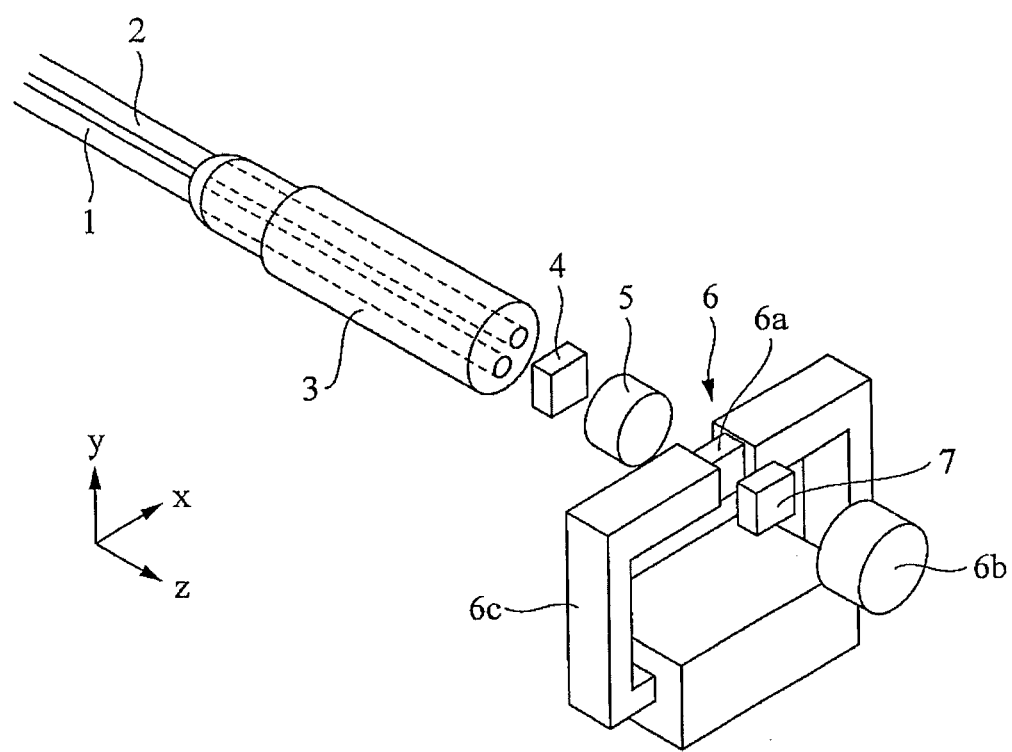
FIG. 1 is a diagram showing a conventional example.

The dual-core ferrule, which is omitted from the illustration, may have the same arrangement as the conventional one as shown in FIG. 1. Specifically, when the z-direction is defined as a direction in which incident light travels, the x-direction as a horizontal direction perpendicular to the z-direction, and the y-direction as a vertical direction perpendicular to the z-direction, then an input fiber and an output fiber are juxtaposed in the x-direction so as to be in parallel to each other. Ends of those fibers are mounted into the dual-core ferrule, and the position of the input/output port is specified. The birefringent element 11 is formed of a single crystal of rutile. The birefringent element 11 functions as a polarizer and an analyzer. The birefringent element 11 may employ basically the same birefringent element as a conventional birefringent element disclosed in Patent Literature 1 or the like. The lens 13 may employ a convex lens or the like. The reflector 15 is positioned at a focus point of the lens 13. Those basic configurations are the same as in conventional technology, and the details thereof are thus omitted herein.

The rotation angle correction Faraday rotator 12 is inserted into and placed within a through hole formed in a cylindrical permanent magnet 17 along an axial direction of the permanent magnet 17. The Faraday rotator 12 is magnetically saturated by magnetic forces of the permanent magnet 17. In a monotone increasing optical attenuator with no variable magnetic field, a plane of polarization of light that has traveled to and fro through the rotation angle correction Faraday rotator 12 and a Faraday rotator 20 is rotated through 90 degrees. Then 100% of the light is coupled by the birefringent element 11 and outputted to the output port.

Here in the present invention, the variable polarization rotation means 14 has the following components: Specifically, as with the conventional example, a flat rectangular Faraday rotator 20 is arranged so as to be perpendicular to an optical path on which incident light travels.

Furthermore, a composite magnetic field of a fixed magnetic field and a variable magnetic field is applied to the Faraday rotator 20 from two perpendicular directions. A fixed magnetic field H1 is a magnetic field for magnetically saturating the Faraday rotator 20 and is configured to be applied in an in-plane direction of the Faraday rotator 20. A variable magnetic field H2 is a magnetic field for controlling a Faraday rotation angle of the Faraday rotator 20 and is configured to be applied in a direction of the optical axis of the Faraday rotator 20 (the z-direction) (see FIG. 4(a)). The Faraday rotation angle is determined by a composite rotation angle α, which is determined by a composite magnetic field of the fixed magnetic field H1 and the variable magnetic field H2. The Faraday rotation angle can be controlled by varying the intensity of the variable magnetic field H2 (see FIG. 4(b)).

A specific configuration for applying those magnetic fields includes a pair of permanent magnets 21 arranged on opposite sides of the Faraday rotator 20 in the horizontal direction. Each of the pair of permanent magnets 21 is in the form of a flat plate and has an S-pole or an N-pole on an overall surface facing a side surface of the Faraday rotator 20. Specifically, a surface of one of the permanent magnets that is opposed to the Faraday rotator 20 is configured to be an N-pole while a surface of the other permanent magnets that is opposed to the Faraday rotator 20 is configured to be an S-pole. Thus, a fixed magnetic field H1 generated between the pair of permanent magnets 21 is applied to the Faraday rotator 20 in the in-plane direction of the Faraday rotator 20.

As is apparent from the figures, the pair of permanent magnets 21 are arranged outside of the side surfaces of the Faraday rotator 20. Therefore, even if the permanent magnets 21 are positioned at any locations, they are located outside of optical paths of incident light and reflected light. Accordingly, the permanent magnets 21 can be placed close to the Faraday rotator 20, so that the Faraday rotator 20 can be magnetically saturated by even weak magnetic forces. Thus, according to the present embodiment, the variable optical attenuator can be configured with use of ferrite permanent magnets, which have a weak magnetic force. Ferrite permanent magnets do not rust, therefore, do not require a rust prevention treatment, and are also inexpensive. Therefore, the variable polarization rotation means 14 and hence the reflection type variable optical attenuator 10 can readily and inexpensively be manufactured.

Furthermore, a bias magnetic field applied to the Faraday rotator 20 by the permanent magnets 21 becomes so low that even a low variable magnetic field H2 can rotate the Faraday rotation angle by a sufficient amount. Therefore, in the present embodiment, a variable magnetic field H2 is applied to the Faraday rotator 20 with a solenoid coil 22 of an air-core coil. Specifically, the Faraday rotator 20 is positioned within an internal space of the cylindrical solenoid coil 22 such that an axial center of the solenoid coil 22 accords with the optical axis of the Faraday rotator 20. Thus, when a current is supplied to the solenoid coil 22, a magnetic field is generated along the axial center of the solenoid coil 22 within the internal space of the solenoid coil 22. Therefore, a magnetic field can be applied to the Faraday rotator 20 along the optical axis of the Faraday rotator 20 (the z-direction). By controlling a current supplied to the solenoid coil 22, the intensity of the variable magnetic field H2 can be controlled. In the present embodiment, since the permanent magnets 21 are located close to the Faraday rotator 20, the permanent magnets 21 are also located within the internal space of the solenoid coil 22.

Means for applying a variable magnetic field H2 can be implemented by the solenoid coil 22 of an air-core coil. Therefore, a core having a high magnetic permeability as required in conventional technology becomes unnecessary. Along with reduction of a current being supplied, means for generating a magnetic field to apply a variable magnetic field H2 can be formed with a compact and simple arrangement. Furthermore, no special rust prevention treatment is required.

Thus, a low fixed magnetic field and a low variable magnetic field are generated, and a rotation angle of the Faraday rotator 20 is rotated by a composite magnetic field of the low magnetic fields. Accordingly, magnetic forces due to the variable magnetic field can be controlled and adjusted instantaneously. The reflection type variable optical attenuator 10 can achieve faster response. Furthermore, in the variable polarization rotation means 14, the permanent magnets 21 for applying a fixed magnetic field H1 as a bias magnetic field are located close to the Faraday rotator 20, and the solenoid coil 22 is arranged so as to surround the Faraday rotator 20 and the permanent magnets 21. Therefore, the outside dimension and shape of the variable polarization rotation means 14 is identical to the outside dimension and shape of the solenoid coil 22. Accordingly, the variable polarization rotation means 14 can be integrated compactly and reduced in size. Additionally, since a current being supplied can be reduced, an electric power consumption of the reflection type variable optical attenuator 10 can also be reduced.

Figure 2:
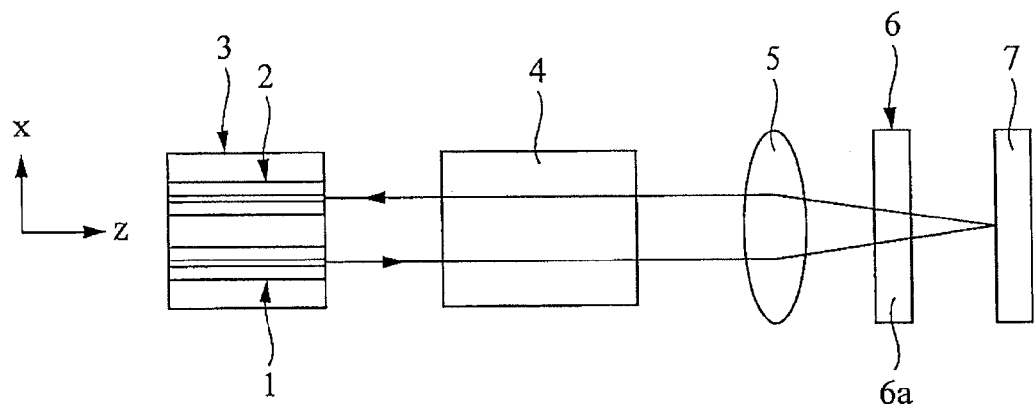
FIGS. 2(a) and 2(b) are diagrams explanatory of the principle of operation of a reflection type variable optical attenuator.
Figure 2:
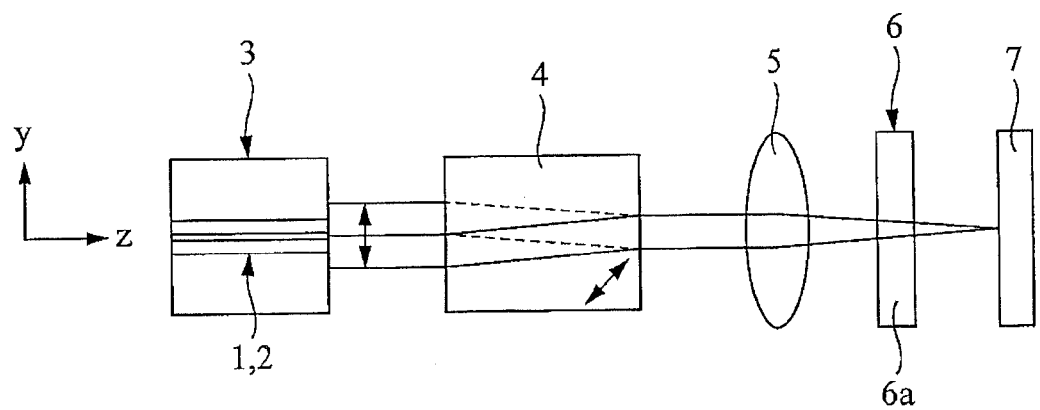

The principle of operation of the reflection type variable optical attenuator 10 in the present embodiment is basically the same as the conventional one described with reference to FIGS. 2(a) and 2(b). Specifically, although means for applying a fixed magnetic field H1 and a variable magnetic field H2 in the variable polarization rotation means 14 is different from the conventional example, the Faraday rotation angle of the Faraday rotator 20 is rotated by the variable polarization rotation means 14 to achieve a desired Faraday rotation angle. Therefore, 100% of reflected light can be outputted from the output port, or no reflected light can be outputted from the output port. Alternatively, reflected light can be outputted from the output port with a proper amount of attenuation that is intermediate between 100% and zero.

Figure 4:
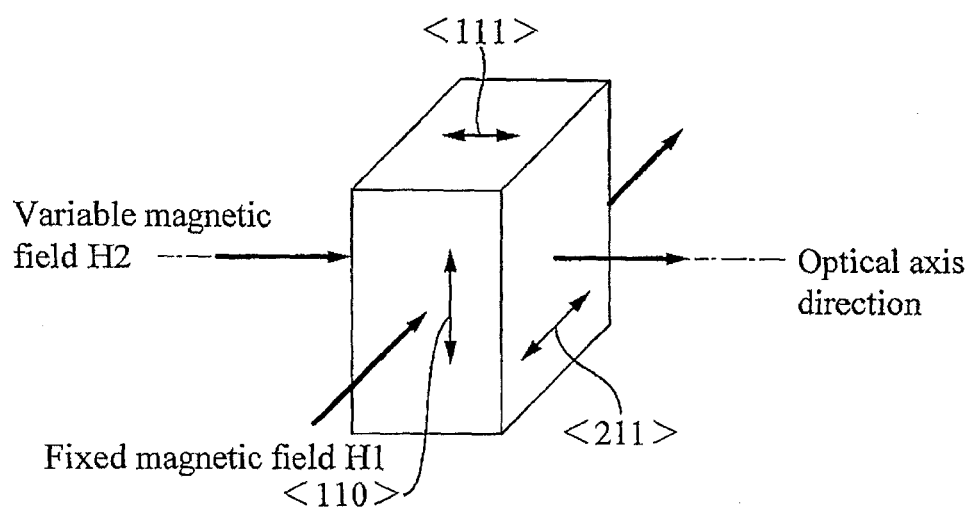
FIG. 4(a) is a diagram explanatory of directions in which magnetic fields are applied to a Faraday rotator.
FIG. 4(b) is a diagram to show that a Faraday rotation angle is determined by a fixed magnetic field H1 and a variable magnetic field H2.
Figure 4:
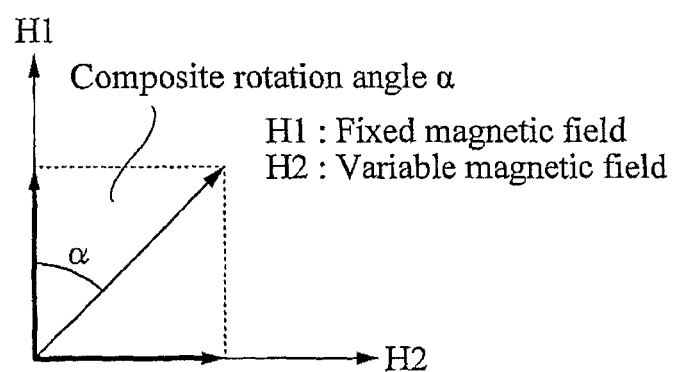

Furthermore, in the present embodiment, the Faraday rotator employs a single crystal of rare-earth iron garnet. As shown in FIG. 4(a), a direction of the fixed magnetic field H1 (bias magnetic field) to be applied to the Faraday rotator 20 by the permanent magnets 21 is set to be the <211> direction of the Faraday rotator, and a direction of the variable magnetic field H2 to be applied by the solenoid coil 22 is set to be the <111> direction of the Faraday rotator. Specifically, when a saturation magnetic field intensity of the single crystal of rare-earth iron garnet of the Faraday rotator was examined in the in-plane direction, which was perpendicular to the beam direction, it was the lowest in the <211> direction. Therefore, magnetic forces of the permanent magnets 21 can further be reduced by adjusting and applying the fixed magnetic field H1 in the <211> direction, which has a low saturation magnetic field intensity. Thus, the reflection type variable optical attenuator 10 can achieve further size reduction. Moreover, magnetic forces generated from the variable magnetic field H2 can accordingly be reduced.

Figure 5:
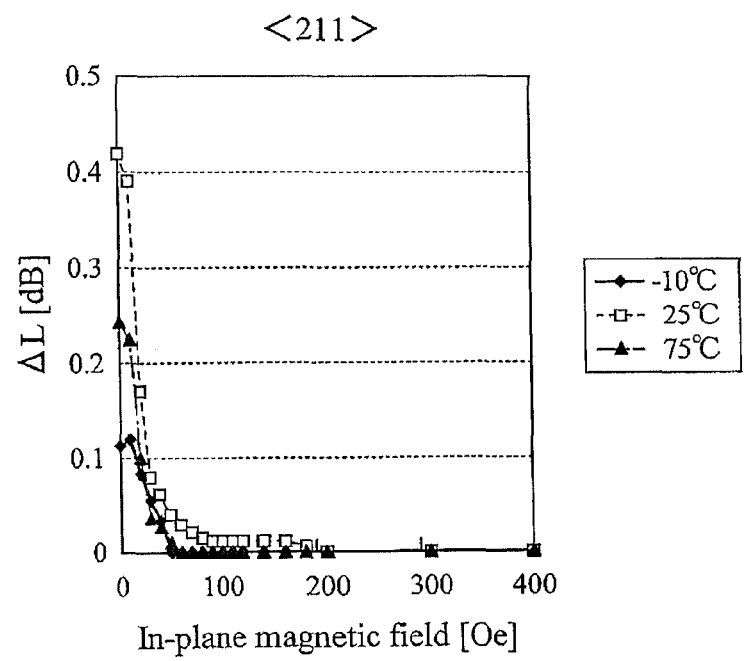
FIGS. 5(a) and 5(b) are graphs showing the relationship between a magnetic field applied to magnetically saturate a Faraday rotator and a loss.
Figure 5:
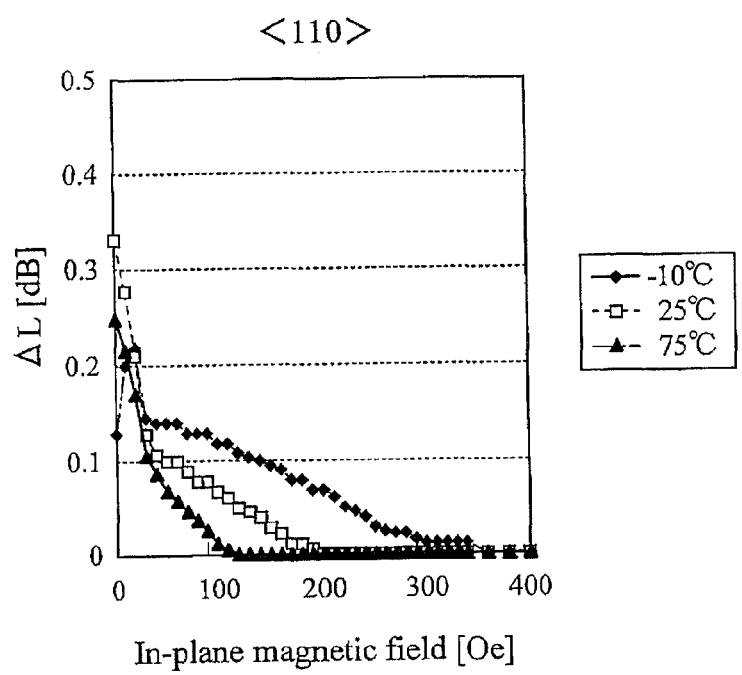

FIG. 5(a) shows magnetic field-scattering loss characteristics in a case where an in-plane magnetic field was applied in the <211> direction, and FIG. 5(b) shows magnetic field-scattering loss characteristics in a case where an in-plane magnetic field was applied in the <110> direction. When a scattering loss (ΔL) becomes zero, magnetic saturation can be assumed. Therefore, if the magnetic field has an intensity of about 100 oersteds in the case of the <211> direction, magnetic saturation is confirmed in a usual environment for use ranging from −10° C. to 75° C. In contrast, if the magnetic field has an intensity of about 100 oersteds in the case of the <110> direction, magnetic saturation is confirmed in a high-temperature environment of 75° C. However, in consideration of an environment of a room temperature (25° C.) and a low-temperature environment of −10° C., at least 300 oersteds are required.

Figure 6:
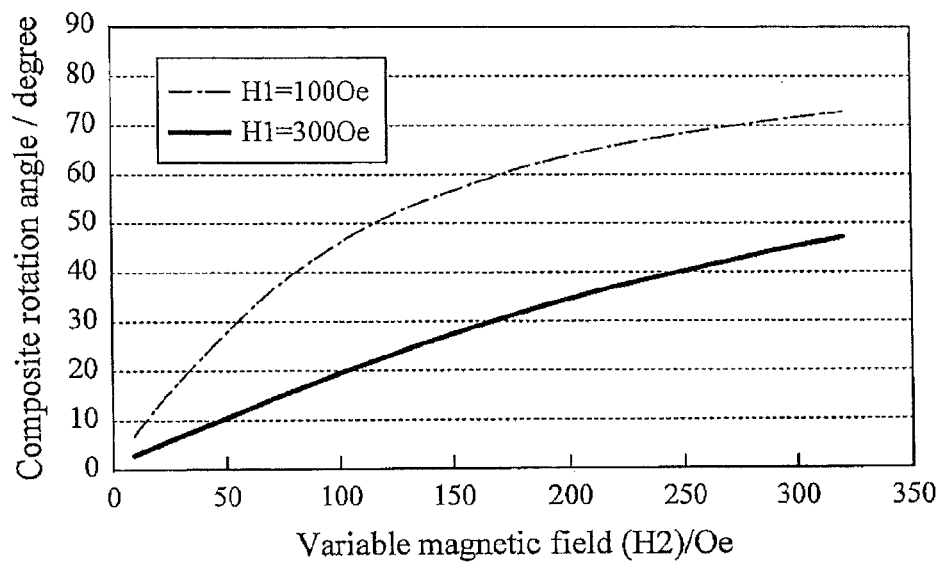
FIG. 6 is a graph showing the relationship between a variable magnetic field and a composite rotation angle due to a fixed magnetic field.
Figure 7:
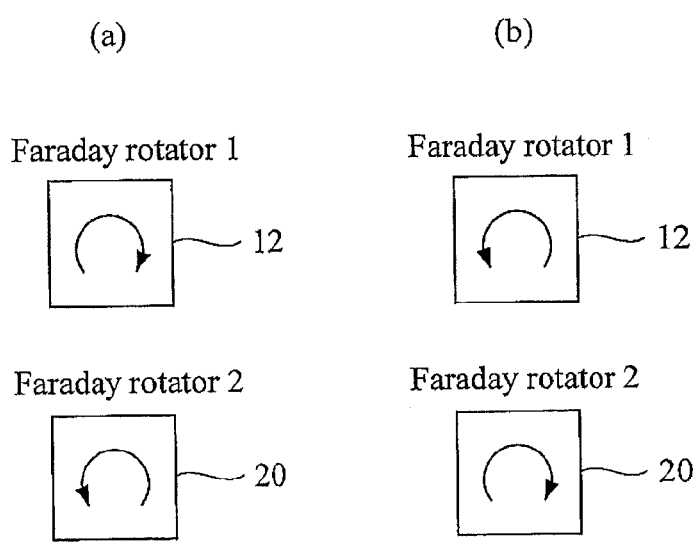
FIGS. 7(a) and 7(b) are diagrams explanatory of combinations of rotation directions of a Faraday rotator 20 and a rotation angle correction Faraday rotator 12.

FIG. 6 shows characteristics of a composite rotation angle to a variable magnetic field H2 in cases where a fixed magnetic field H1 as a bias magnetic field was 100 oersteds and 300 oersteds, respectively. As a matter of course, when the fixed magnetic field H1 was equal to the variable magnetic field H2, the composite rotation angle became 45 degrees. As the fixed magnetic field H1 is lower, the amount of change in composite rotation angle to the variable magnetic field becomes larger. In other words, in order to maintain the same angular range of the composite rotation angle, only a narrower range of the variable magnetic field H2 is required to be changed as the fixed magnetic field H1 is lower.

Accordingly, when a fixed magnetic field H1 is applied in the <211> direction as in the present embodiment, magnetic forces generated by each of the magnetic field generation means of the permanent magnets 21 and the solenoid coil 22 can be suppressed as compared to the case where a fixed magnetic field H1 is applied in the <110> direction.

Figure 8:
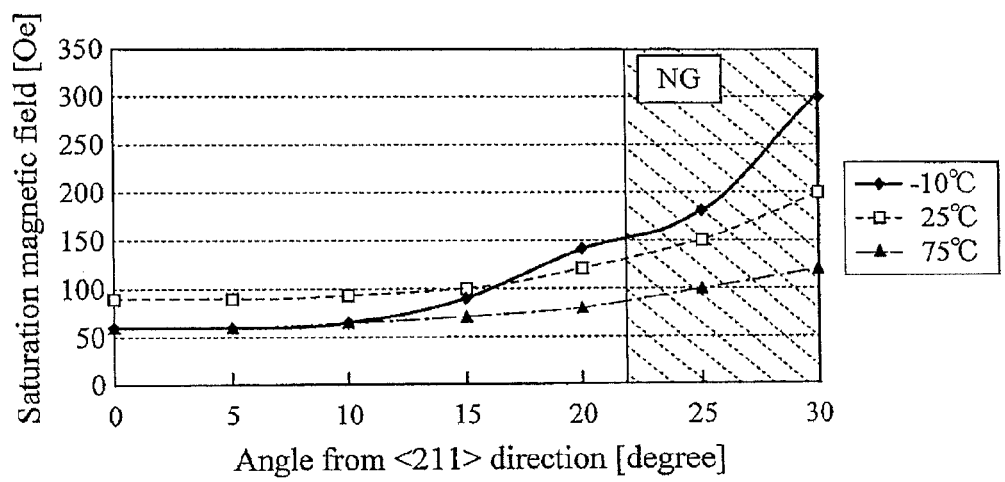
FIGS. 8(a) and 8(b) are graphs showing the relationship of a saturation magnetic field and a maximum attenuation with respect to an angle from the <211> direction.
Figure 8:
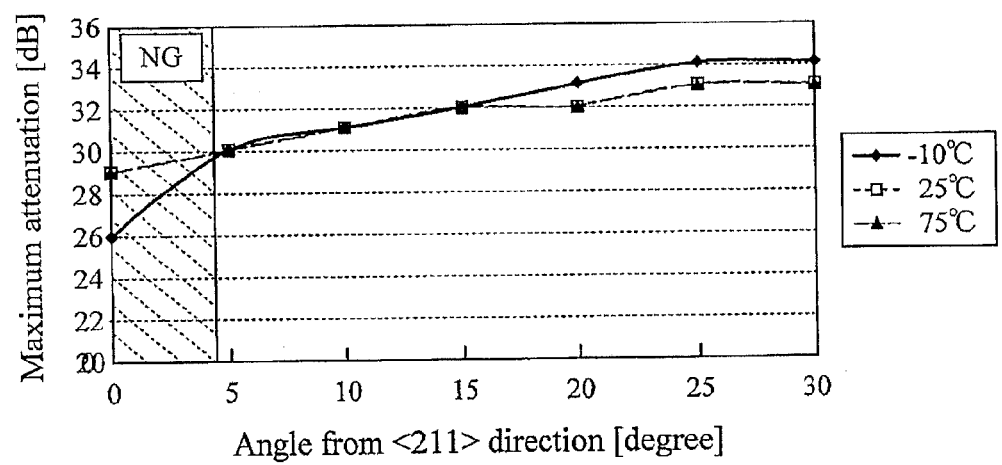

In the aforementioned embodiment, the magnetic field application direction of the fixed magnetic field H1 is the <211> direction. Nevertheless, it is more preferable to employ a range of 5 degrees to 20 degrees from the <211> direction. Specifically, while the <211> direction is preferable because a saturation magnetic field can be reduced as described above, there is a hard axis in a magnetic field displacement path, which deteriorates an extinction ratio. More specifically, the maximum attenuation may be less than 30 dB in some cases. Therefore, the <211> direction cannot be used in some cases depending upon required specifications. Meanwhile, in the case of the <110> direction as described above, while a saturation magnetic field is high, an extinction ratio is not deteriorated. Thus, an insertion loss (saturation magnetic field) and an extinction ratio (maximum attenuation) were measured when an angle of a direction in which a magnetic field is applied was varied between the <211> direction and the <110> direction so that a fixed magnetic field was applied to the Faraday rotator. Then the results as shown in FIG. 8(a) were obtained for a saturation magnetic field, and the results as shown in FIG. 8(b) were obtained for a maximum attenuation.

As is apparent from the figures, assuming that the required specifications include a temperature range from −10° C. to 75° C. and that the insertion loss is not more than 150 oersteds of a magnetic field of the permanent magnets, an upper limit of an angle from the <211> direction should be 20 degrees or less. Similarly, if 100 oersteds or less is required, a preferable range is 15 degrees or less (more certainly, 10 degrees or less). If the specifications require an extinction ratio (maximum attenuation) of at least 30 dB, a lower limit of an angle from the <211> direction should be 5 degrees or more. Accordingly, a more preferable range is 5 degrees to 20 degrees from the <211> direction.

DESCRIPTION OF THE REFERENCE NUMERALS 10 reflection type variable optical attenuator
11 birefringent element
12 rotation angle correction Faraday rotator
13 lens
14 variable polarization rotation means
15 reflector
20 Faraday rotator
21 permanent magnet
22 solenoid coil

The invention claimed is:

1. A reflection type variable optical attenuator having an optical input/output portion, an optical attenuation mechanism having Faraday rotator, and a reflector arranged along an optical axis in order named, wherein:
   the optical attenuation mechanism includes a permanent magnet for applying a fixed magnetic field to the Faraday rotator in an in-plane direction to magnetically saturate the Faraday rotator and variable magnetic field generation means for applying a variable magnetic field to the Faraday rotator in a direction of the optical axis, the permanent magnet is arranged so as to face a side surface of the Faraday rotator in a direction intersecting the optical axis, and
   wherein the permanent magnet comprises a ferrite permanent magnet, the variable magnetic field generation means comprises an air-core coil, and the Faraday rotator and the permanent magnet are arranged within an internal space of the air-core coil.

2. The reflection type variable optical attenuator as recited in claim 1, wherein the Faraday rotator comprises a single crystal of rare-earth iron garnet, a direction in which the fixed magnetic field is applied is set to be an <211> direction of the Faraday rotator, and a direction in which the variable magnetic field is applied is set to be an <111> direction of the Faraday rotator.

3. The reflection type variable optical attenuator as recited in claim 1, wherein the Faraday rotator comprises a single crystal of rare-earth iron garnet, a direction in which the fixed magnetic field is applied is set to be 5 degrees to 20 degrees from an <211> direction of the Faraday rotator, and a direction in which the variable magnetic field is applied is set to be an <111> direction of the Faraday rotator.

4. The reflection type variable optical attenuator as recited in claim 1, further comprising:
   a rotation angle correction Faraday rotator that is arranged on the optical axis; and magnetic field application means for setting a Faraday rotation angle of the rotation angle correction Faraday rotator,
   wherein a Faraday rotation angle of the Faraday rotator and the Faraday rotation angle of the rotation angle correction Faraday rotator are set such that 100% of reflected light of incident light inputted from the optical input/output portion that has been reflected from the reflector is outputted from the optical input/output portion or is blocked when the variable magnetic field is zero.

5. The reflection type variable optical attenuator as recited in claim 1, wherein the Faraday rotator comprises a single crystal of rare-earth iron garnet, a direction in which the fixed magnetic field is applied is set to be an <211> direction of the Faraday rotator, and a direction in which the variable magnetic field is applied is set to be an <111> direction of the Faraday rotator.

6. The reflection type variable optical attenuator as recited in claim 1, wherein the Faraday rotator comprises a single crystal of rare-earth iron garnet, a direction in which the fixed magnetic field is applied is set to be 5 degrees to 20 degrees from an <211> direction of the Faraday rotator, and a direction in which the variable magnetic field is applied is set to be an <111> direction of the Faraday rotator.

7. The reflection type variable optical attenuator as recited in claim 1, further comprises:
   a rotation angle correction Faraday rotator that is arranged on the optical axis; and magnetic field application means for setting a Faraday rotation angle of the rotation angle correction Faraday rotator,
   wherein a Faraday rotation angle of the Faraday rotator and the Faraday rotation angle of the rotation angle correction Faraday rotator are set such that 100% of reflected light of incident light inputted from the optical input/output portion that has been reflected from the reflector is outputted from the optical input/output portion or is blocked when the variable magnetic field is zero.

8. The reflection type variable optical attenuator as recited in claim 2, further comprises:

a rotation angle correction Faraday rotator that is arranged on the optical axis; and magnetic field application means for setting a Faraday rotation angle of the rotation angle correction Faraday rotator, wherein a Faraday rotation angle of the Faraday rotator and the Faraday rotation angle of the rotation angle correction Faraday rotator are set such that 100% of reflected light of incident light inputted from the optical input/output portion that has been reflected from the reflector is outputted from the optical input/output portion or is blocked when the variable magnetic field is zero.

9. The reflection type variable optical attenuator as recited in claim 3, further comprises:

a rotation angle correction Faraday rotator that is arranged on the optical axis; and magnetic field application means for setting a Faraday rotation angle of the rotation angle correction Faraday rotator, wherein a Faraday rotation angle of the Faraday rotator and the Faraday rotation angle of the rotation angle correction Faraday rotator are set such that 100% of reflected light of incident light inputted from the optical input/output portion that has been reflected from the reflector is outputted from the optical input/output portion or is blocked when the variable magnetic field is zero.

10. The reflection type variable optical attenuator as recited in claim 6, further comprises:

a rotation angle correction Faraday rotator that is arranged on the optical axis; and magnetic field application means for setting a Faraday rotation angle of the rotation angle correction Faraday rotator, wherein a Faraday rotation angle of the Faraday rotator and the Faraday rotation angle of the rotation angle correction Faraday rotator are set such that 100% of reflected light of incident light inputted from the optical input/output portion that has been reflected from the reflector is outputted from the optical input/output portion or is blocked when the variable magnetic field is zero.

11. The reflection type variable optical attenuator as recited in claim 5, further comprises:

a rotation angle correction Faraday rotator that is arranged on the optical axis; and magnetic field application means for setting a Faraday rotation angle of the rotation angle correction Faraday rotator, wherein a Faraday rotation angle of the Faraday rotator and the Faraday rotation angle of the rotation angle correction Faraday rotator are set such that 100% of reflected light of incident light inputted from the optical input/output portion that has been reflected from the reflector is outputted from the optical input/output portion or is blocked when the variable magnetic field is zero.

* * * * *